United States Patent
Zhu et al.

(10) Patent No.: US 10,785,781 B2
(45) Date of Patent: Sep. 22, 2020

(54) DATA TRANSMISSION METHOD, TERMINAL AND DATA TRANSMISSION SYSTEM

(71) Applicant: YULONG COMPUTER TELECOMMUNICATION SCIENTIFIC (SHENZHEN) CO., LTD., Shenzhen (CN)

(72) Inventors: Ya-Jun Zhu, Shenzhen (CN); Ming-Ju Li, Shenzhen (CN); Yun-Fei Zhang, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 144 days.

(21) Appl. No.: 16/075,668

(22) PCT Filed: Aug. 29, 2016

(86) PCT No.: PCT/CN2016/097166
§ 371 (c)(1),
(2) Date: Aug. 6, 2018

(87) PCT Pub. No.: WO2017/133232
PCT Pub. Date: Aug. 10, 2017

(65) Prior Publication Data
US 2019/0053257 A1    Feb. 14, 2019

(30) Foreign Application Priority Data
Feb. 5, 2016  (CN) .......................... 2016 1 0082193

(51) Int. Cl.
H04W 72/12    (2009.01)
H04W 76/27    (2018.01)
(Continued)

(52) U.S. Cl.
CPC ....... *H04W 72/1205* (2013.01); *H04L 1/0061* (2013.01); *H04W 4/025* (2013.01);
(Continued)

(58) Field of Classification Search
CPC .................................................. H04W 72/1205
See application file for complete search history.

(56) References Cited

U.S. PATENT DOCUMENTS

2007/0171849 A1    7/2007   Zhang et al.
2018/0092128 A1*   3/2018   Um .................. H04W 72/0406

FOREIGN PATENT DOCUMENTS

CN    101242668 A    8/2008
CN    101277529 A    10/2008
(Continued)

*Primary Examiner* — Kodzovi Acolatse
*Assistant Examiner* — Abdeltif Ajid
(74) *Attorney, Agent, or Firm* — ScienBiziP, P.C.

(57) ABSTRACT

A data transmission method, a terminal, a base station and a data transmission system are disclosed, the method applied to a terminal includes: receiving a scheduling instruction issued by a base station, the scheduling instruction carrying a location identifier, and the scheduling instruction being used for scheduling one or more transmission subframes; obtaining the location identifier; determining a transmission subframe according to the location identifier, a subframe where the scheduling instruction is located, and a scheduling location identification rule, the scheduling location identification rule including correspondence relations between the location identifier, the subframe where the scheduling instruction is located and the transmission subframe; transmitting data through the transmission subframe. The terminal obtains the location identifier and finds a transmission subframe to perform a data transmission and then realize data transmission across the subframes.

12 Claims, 5 Drawing Sheets

(51) Int. Cl.
*H04L 1/00* (2006.01)
*H04W 4/02* (2018.01)
*H04W 72/04* (2009.01)
*H04W 80/02* (2009.01)

(52) U.S. Cl.
CPC ... *H04W 72/0466* (2013.01); *H04W 72/1289* (2013.01); *H04W 76/27* (2018.02); *H04W 72/0446* (2013.01); *H04W 80/02* (2013.01)

(56) References Cited

FOREIGN PATENT DOCUMENTS

| | | |
|---|---|---|
| CN | 101499895 A | 8/2009 |
| CN | 102752862 A | 10/2012 |

* cited by examiner

DATA TRANSMISSION METHOD, TERMINAL AND DATA TRANSMISSION SYSTEM

CROSS-REFERENCE TO RELATED APPLICATIONS

This application claims priority of Chinese Patent Application No. 201610082193.9, entitled "data transmission method, terminal and data transmission system," filed on Feb. 5, 2016 in the SIPO (State Intellectual Property Office of the People's Republic of China), the entire contents of which are incorporated by reference herein.

FIELD

The present disclosure relates to a technical field of data transmission, specifically a data transmission method, a terminal and a data transmission system.

BACKGROUND

In a traditional Long Term Evolution (LTE) communication implementation, under the condition that without considering semi-persistent scheduling, for a downlink transmission, a scheduling instruction can schedule data blocks in a subframe where the scheduling instruction is located. That is, after receiving a downlink scheduling instruction, the terminal responds to the downlink scheduling instruction, and realizes receiving of downlink data blocks based on an indication of the scheduling instruction for the data block in the subframe where the scheduling instruction is located. For an uplink transmission, a scheduling instruction can only schedule data block transmission of one uplink subframe, thus after receiving an uplink scheduling instruction, the terminal responds to the uplink scheduling instruction, and sends uplink data blocks based on the indication of the scheduling instruction on the corresponding uplink subframe.

In the existing technology, the terminal can only transmit data through the corresponding subframe of the scheduling instruction, and cannot schedule other subframes for transmission, thus, cannot perform a data transmission across the subframes.

SUMMARY

Accordingly, the purpose of the present disclosure is to provide a data transmission method, a terminal and a data transmission system, for solving a technical problem that cannot be realized in the existing technology, the technical problem being that other subframes cannot be scheduled for data transmission, the other subframes being different from a subframe where a scheduling of the scheduling subframe is located.

The present disclosure provides a data transmission method, which is applied to a terminal. The data transmission method includes: receiving a scheduling instruction issued by a base station, the scheduling instruction carrying a location identifier, and the scheduling instruction being used for scheduling one or more transmission subframes; obtaining the location identifier; determining a transmission subframe according to the location identifier, a subframe where the scheduling instruction is located, and a scheduling location identification rule, the scheduling location identification rule including corresponding relationships between the location identifier, the subframe where the scheduling instruction is located and the transmission subframe; transmitting data through the transmission subframe.

In the above method, optionally, obtaining the location identifier includes: obtaining the location identifier from a start location or an end location of the scheduling instruction, the location identifier including at least one bit, and a length of the bits in the location identifier is fixed.

In the above method, optionally, obtaining the location identifier includes: performing a cyclic redundancy check (CRC) scrambling processing on the scheduling instruction, and obtaining a scrambling sequence code as the location identifier.

In the above method, optionally, when there are a plurality of scheduling instructions, the plurality of scheduling instructions are received as an instruction set in a form of joint encoding; correspondingly, obtaining the location identifier includes: decoding a jointly encoded instruction set, and obtaining each of the plurality of scheduling instructions; obtaining a location identifier corresponding to each of the scheduling instructions.

The above method, optionally, before determining the transmission subframe, further includes: receiving the scheduling location identification rule issued by the base station through a target signaling channel, the target signaling channel being a Radio Resource Control (RRC) channel, a media access control (MAC) control element (CE) channel or a physical layer channel.

The present disclosure further provides a terminal, which includes: an instruction receiving unit configured to receive a scheduling instruction issued by a base station, the scheduling instruction carrying a location identifier, and the scheduling instruction being used for scheduling one or more transmission subframes; a location identifier obtaining unit configured to obtain the location identifier; a subframe determination unit configured to determine a transmission subframe according to the location identifier, a subframe where the scheduling instruction is located, and a scheduling location identification rule, the scheduling location identification rule including corresponding relationships between the location identifier, the subframe where the scheduling instruction is located and the transmission subframe; a data transmission unit configured to transmit data through the transmission subframe.

In the above terminal, optionally, the location identifier obtaining unit includes: a first obtaining subunit configured to obtain the location identifier from a start location or an end location of the scheduling instruction, the location identifier including at least one bit, and a length of the bits in the location identifier is fixed.

In the above terminal, optionally, the location identifier obtaining unit includes: a second obtaining subunit configured to perform a cyclic redundancy check (CRC) scrambling processing on the scheduling instruction, and obtain a scrambling sequence code as the location identifier.

In the above terminal, optionally, there are a plurality of scheduling instructions, and the plurality of scheduling instructions are received as an instruction set in a form of joint encoding; correspondingly, the location identifier obtaining unit includes: a instruction decoding subunit configured to decode a jointly encoded instruction set, and obtaining each of the plurality of scheduling instructions; obtain a location identifier corresponding to each of the scheduling instructions.

In the above terminal, optionally, the terminal further includes: a rule receiving unit configured to receive the scheduling location identification rule issued by the base station through a target signaling channel before the instruction receiving unit receives the scheduling instruction issued by the base station, the target signaling channel being a Radio Resource Control (RRC) channel, a media access control control element (MAC CE) channel or a physical layer channel.

The present disclosure further provides a data transmission system, which includes: a terminal and a base station, and the base station generates a scheduling instruction, the scheduling instruction carrying a location identifier, and the scheduling instruction being used for scheduling one or more transmission subframes; the base station sends the scheduling instruction to the terminal; the terminal obtains the location identifier after receiving the scheduling instruction, and determines a transmission subframe according to the location identifier, the subframe where the scheduling instruction is located, and a scheduling location identification rule, the scheduling location identification rule including corresponding relationships between the location identifier, the subframe where the scheduling instruction is located and the transmission subframe, and transmits data through the transmission subframe.

According to the system, optionally, there are a plurality of scheduling instructions generated by the base station, the base station jointly encodes the plurality of scheduling instructions to obtain an instruction set, and sends the instruction set to the terminal, each of the scheduling instructions carrying a location identifier.

BRIEF DESCRIPTION OF THE DRAWINGS

In order to more clearly illustrate the technical solution in the embodiment of the present disclosure, drawings are used in the description of the embodiments will be briefly introduced below. Obviously, the following drawings show only some embodiments of the present application, and for those of ordinary skilled in the art, other drawings can be developed according to these drawings without any creative efforts.

DETAILED DESCRIPTION

The technical solutions in the embodiments of the present application are clearly and completely described in the following with reference to the drawings in the embodiments of the present application, apparently, the described embodiments are merely a part of the embodiments of the present application, rather than all embodiments. Based on the embodiments of the present application, all other embodiments obtained by those skilled in the art without creative efforts are within the scope of the present application.

Figure 1:
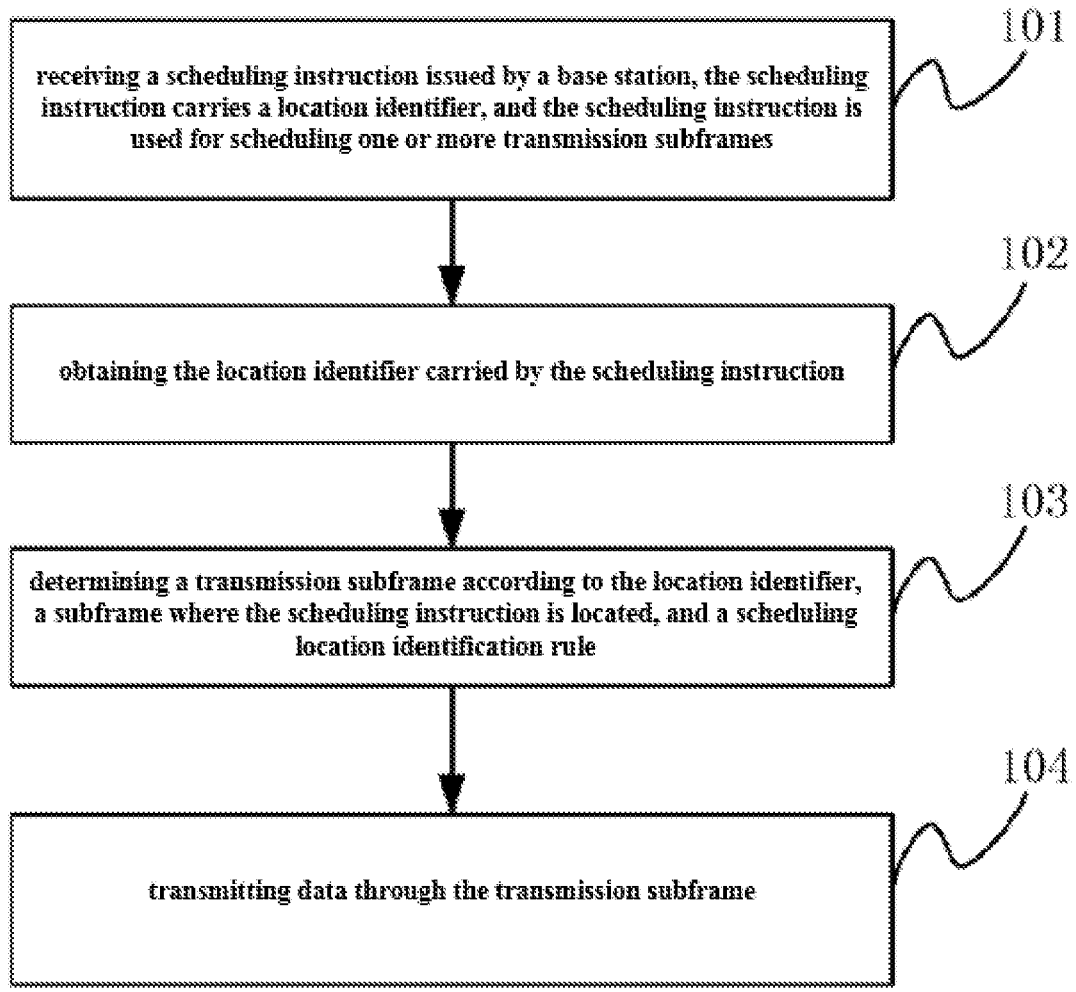
FIG. 1 is a flowchart of a data transmission method according to a first embodiment of the present disclosure.

Referring to FIG. 1, a flowchart of a data transmission method according to a first embodiment of the present disclosure is provided, the method can be applied to a terminal for performing a data transmission, such as a terminal for receiving data in a downlink transmission or a terminal for sending data in a uplink transmission.

Specifically, in the embodiment, the method includes the following steps:

101: receiving a scheduling instruction issued by a base station. The scheduling instruction carries a location identifier, and the scheduling instruction is used for scheduling one or more transmission subframes.

The scheduling instruction can be a single instruction, thus a transmission subframe for a data transmission can be scheduled; or, the scheduling instruction can also be an instruction set including of a plurality of instructions, thus a plurality of transmission subframes for data transmission can be scheduled.

It should be noted that the scheduling instruction is generated and sent by a base station, so that the terminal can receive the scheduling instruction.

102: obtaining the location identifier carried by the scheduling instruction.

The location identifier can be an information code directly included in the scheduling instruction, or can also be an information code represented by the scheduling instruction. Therefore, after receiving the scheduling instruction, the terminal obtains a location identifier carried by the scheduling instruction.

103: determining a transmission subframe according to the location identifier, a subframe where the scheduling instruction is located, and a scheduling location identification rule.

The scheduling location identification rule includes corresponding relationships between the location identifier, the subframe where the scheduling instruction is located and the transmission subframe.

Specifically, the scheduling location identification rule includes: information rules for location correspondences between the subframe where the scheduling instruction, which can be represented by a location identifier, is located and the transmission subframe that needs to be found. Therefore, in one embodiment, after obtaining the location identifier carried by the scheduling instruction, based on the scheduling location identification rule, a location correspondence between the subframe where the scheduling instruction is located and the transmission subframe that needs to be found is identified, the scheduling instruction can be represented by a location identifier, and a transmission subframe that needs to be found is determined through the location correspondence and the location of the subframe where the scheduling instruction is located.

It should be noted that the scheduling location identification rule is an identification rule for an agreement between the base station and the terminal, that is to say, the scheduling location identification rule is sent to the terminal in advance by the base station, thus the base station and the terminal can perform data transmission based on a consistent protocol.

104: transmitting data through the transmission subframe.

Specifically, in the embodiment, the transmission subframe is used for receiving data or transmitting data. For example, in a downlink transmission, the terminal uses the transmission subframe for receiving data; in a uplink transmission, the terminal uses the transmission subframe for transmitting data.

According to the above solution, in the data transmission method provided by the first embodiment of the present disclosure, after receiving the scheduling instruction sent by the base station, the location identifier carried by the scheduling instruction is obtained, and based on the location identifier and the scheduling location identification rule, which includes the location correspondence between the transmission subframe and the subframe where the scheduling instruction is located, a transmission subframe is determined, and then a data transmission is performed through the transmission subframe, thus, a data transmission across the subframes is realized, and the purpose of this embodiment is achieved.

It should be noted that when the scheduling instruction is a single instruction, the scheduling instruction carries one location identifier, in one embodiment, after the terminal receives the scheduling instruction, the location identifier carried by the scheduling instruction is obtained, and according to the location identifier, the subframe where the scheduling instruction is located, and the scheduling location identification rule a transmission subframe is determined, and then a data transmission is performed through the transmission subframe, which includes transmitting data in a uplink transmission or receiving data in a downlink transmission, and the purpose of this embodiment is achieved.

In addition, when there are a plurality of scheduling instructions, the plurality of scheduling instructions are received as an instruction set in a form of joint encoding, that is to say, after the base station jointly encodes the plurality of scheduling instructions, a instruction set is obtained, and then the instruction set in the form of joint coding is sent to the terminal. Each of the plurality of scheduling instructions of the instruction set received by the terminal carries a location identifier, each of the scheduling instructions carries a location identifier, and each of the location identifiers may be the same or different, and after the terminal receives the instruction set including a plurality of scheduling instructions, first the jointly encoded scheduling instructions are decoded, and each independent scheduling instruction is obtained, and a cross-subframe scheduling of a plurality of transmission subframes is realized through the plurality of scheduling instructions, and a data transmission of a plurality of subframes is performed, which includes transmitting data in a uplink transmission or receiving data in a downlink transmission, and the purpose of this embodiment is achieved.

Figure 2:
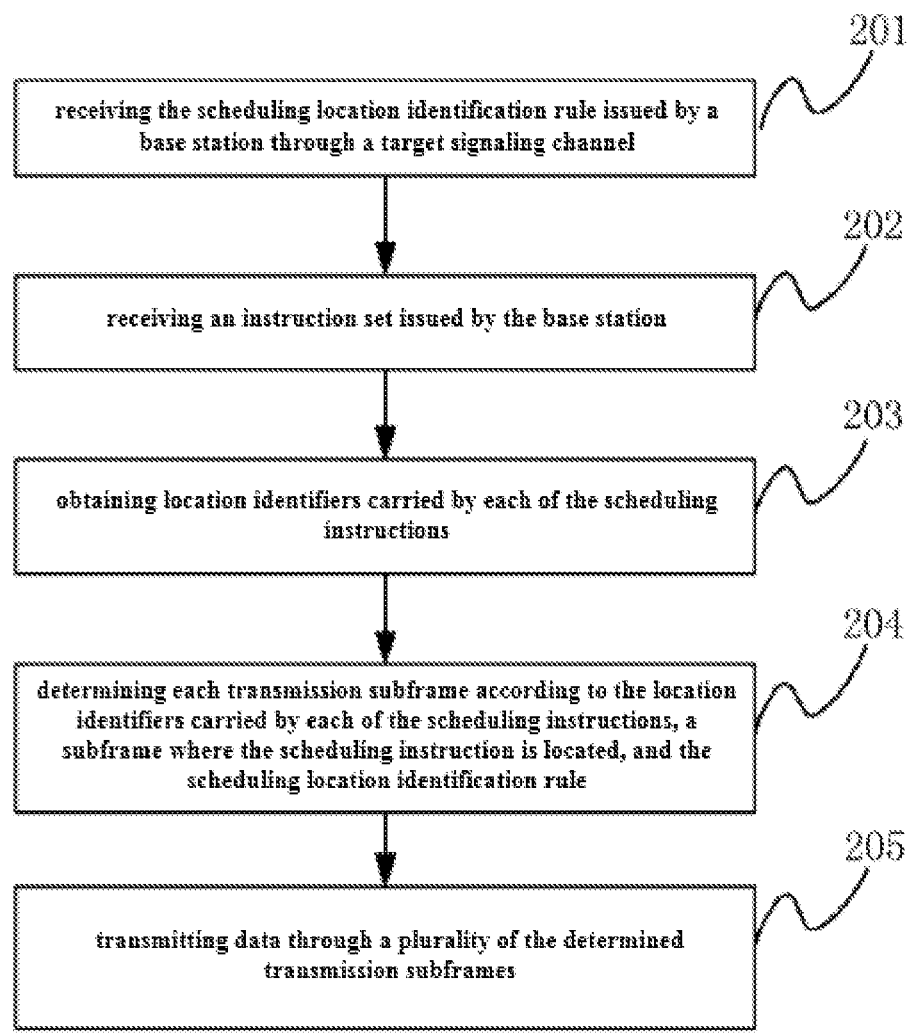
FIG. 2 is a flowchart of a data transmission method according to a second embodiment of the present disclosure.

Specifically, referring to FIG. 2, a flowchart of a data transmission method according to a second embodiment of the present disclosure is provided, the method includes the following steps:

201: receiving the scheduling location identification rule issued by a base station through a target signaling channel.

The target signaling channel is a Radio Resource Control (RRC) channel, a media access control (MAC) control element (CE) channel or a physical layer channel. That is to say, on the terminal side, the terminal of the embodiment receives the scheduling location identification rule issued by the base station through a Radio Resource Control (RRC) channel, a media access control (MAC) control element (CE) channel or a physical layer channel.

202: receiving an instruction set issued by the base station. The instruction set includes a plurality of scheduling instructions, and the plurality of scheduling instructions are in a form of joint encoding, each scheduling instruction carries a location identifier, and each scheduling instruction is used for scheduling a transmission subframe.

Specifically, in 202, after the terminal receives an instruction set in a form of joint encoding, it is necessary to decode the jointly encoded instruction set to obtain each of the scheduling instructions.

203: obtaining location identifiers carried by each scheduling instruction.

204: determining a transmission subframe corresponding to the location identifier carried by each of the scheduling instructions, according to a location identifier carried by each of the scheduling instructions, a subframe where the corresponding scheduling instruction is located, and the scheduling location identification rule.

The scheduling location identification rule includes corresponding relationships between the location identifier, the subframe where the scheduling instruction is located and the transmission subframe.

Specifically, the scheduling location identification rule includes: information rules for location correspondences between the subframe where the scheduling instruction, which can be represented by each location identifier, is located and the transmission subframe that needs to be found. Therefore, in one embodiment, after obtaining each location identifier, based on the scheduling location identification rule, a location correspondence between the subframe where the scheduling instruction is located and the transmission subframe that needs to be found is identified, the scheduling instruction can be represented by each location identifier, and a transmission subframe that needs to be found by the location correspondence and the location of the subframe where each scheduling instruction is located, is determined.

205, transmitting data through a plurality of the determined transmission subframes.

Specifically, in the embodiment, the transmission subframe is used for receiving data or transmitting data, for example, in a downlink transmission, the terminal uses the transmission subframe for receiving data; in a uplink transmission, the terminal uses the transmission subframe for transmitting data.

According to the above solution, in the data transmission method provided by the second embodiment of the present disclosure, after receiving an instruction set including a plurality of scheduling instructions issued by the base station, the instruction set is decoded, and each independent scheduling instruction is obtained, thus the location identifier carried by each scheduling instruction is obtained, and a transmission subframe is found based on the location identifier and the scheduling location identification rule received from the base station, the scheduling location identification rule including the location correspondence between a transmission subframe and a subframe where the scheduling instruction is located, and then a data transmission is performed through the transmission subframe, a data transmission across the subframes is realized, and the purpose of this embodiment is achieved.

Based on the above embodiments, the location identifier can be an information code directly included in the scheduling instruction, or can also be an information code represented by the scheduling instruction, the following describes the existence form of the location identifier:

In one implementation, the location identifier is an information field located at a start location or an end location of the scheduling instruction, the length of the location identifier is at least one bit, and the length of the location identifier is fixed. Correspondingly, in the implementation, when the location identifier is obtained, the location identifier is directly obtained from an information field of a start location or an end location of the scheduling instruction.

Specifically, a location of the location identifier in the scheduling instruction is fixed, and a bit length in the location identifier is fixed, either at the start location or at the end location, so that after the terminal receives the scheduling instruction, the location identifier can be obtained directly at the location, and then a transmission subframe is determined according to the location identifier, the subframe where the scheduling instruction is located and the scheduling location identification rule, thus a data transmission is performed through the transmission subframe, a data transmission across the subframes of a plurality of subframes is realized, and the purpose of this embodiment is achieved.

In a specific implementation, the scheduling location identification rule includes information that represents how to obtain the location identifier, such as location information of the location identifier in the scheduling instruction, at the start location or end location, and the bit length information, etc. For example, the scheduling location identification rule includes: a location identifier located at a start location of the scheduling instruction, a bit length of the location identifier, etc.; or the scheduling location identification rule includes: a location identifier located at a end location of the scheduling instruction, a bit length of the location identifier, etc. Thus the terminal can obtain the location identifier based on the information after receiving the scheduling instruction, and then determine a transmission subframe according to the location identifier, the subframe where the scheduling instruction is located and the scheduling location identification rule, thus a data transmission through the transmission subframe is performed, and a data transmission by the transmission subframe is performed.

It should be noted that the bit length in the location identifier is related to a maximum number of subframes that the scheduling instruction can schedule. For example, if a number of subframes that can be scheduled by the scheduling instruction is 8, then a length of the bits in the location identifier only needs to be 3, that is, there are 3 bits in the location identifier. A bit value in the location identifier can be used to represent a location correspondence between the transmission subframe and the subframe where the scheduling instruction is located, for example, based on a subframe where the scheduling instruction is located, the subframe, the next subframe after the subframe, and the second subframe after the subframe . . . the seventh subframe after the subframe, etc.

As shown in the example of the scheduling location identification rule described in table 1 below, if the maximum number of subframes that can be scheduled by the scheduling instruction is 5, and then the length of the location identifier is 3 bits (5 does not exceed 8, but is greater than 4), as shown in table 1:

TABLE 1 scheduling location identification rule

| Location identifier | Location correspondence between the transmission subframe and the subframe where the scheduling instruction is located |
| --- | --- |
| 000 | A subframe where the scheduling instruction is located is a transmission subframe, which is a data transmission of the subframe where the scheduling instruction is located. |
| 001 | The first available subframe after a subframe where the scheduling instruction is located is a transmission subframe, which is a data transmission of the next available subframe after the subframe where the scheduling instruction is located. |
| 010 | The second available subframe after a subframe where the scheduling instruction is located is a transmission subframe, which is a data transmission of the second available subframe after the subframe where the scheduling instruction is located. |
| 011 | The third available subframe after a subframe where the scheduling instruction is located is a transmission subframe, which is a data transmission of the third available subframe after the subframe where the scheduling instruction is located. |
| 100 | The fourth available subframe after a subframe where the scheduling instruction is located is a transmission subframe, which is a data transmission of the fourth available subframe after the subframe where the scheduling instruction is located. |
| 101 | Reserved |
| 110 | Reserved |
| 111 | Reserved |

It should be noted that the location representation of the scheduled subframe in the above table is merely one example. Based on the same reason, the scheduled subframe location may be other subframe locations.

For example, on a terminal side, after receiving the scheduling location identification rules as shown in table 1 and a scheduling instruction, at a fixed location on the scheduling instruction, for example obtaining a location identifier of 3 bits at a start location or an end location, such as code 010, therefore, according to table 1, the second available subframe after the subframe where the scheduling instruction is located is determined to be a transmission subframe, and a data transmission is performed through the transmission subframe; or when the location information code is 100, according to table 1, the fourth available subframe, after the subframe where the scheduling instruction is located, is determined to be a transmission subframe, and a data transmission is performed through the transmission subframe.

After the terminal receives the scheduling location identification rule and the instruction set including a plurality of scheduling instructions in a form of joint encoding, the terminal firstly decodes the instruction set to get each independent scheduling instruction, such as scheduling instruction a1 and a2, and then at a fixed location on each scheduling instruction, such as the location identifier of 3 bits obtained at a start location or an fixed location, such as the location identifier of 3 bits obtained at a start location of scheduling instruction a1: 010, the location identifier of 3 bits obtained at a start location of scheduling instruction a2: 011, according to table 1, the terminal determines that the second available subframe, after the subframe where the scheduling instruction a1 is located, is the transmission subframe that is used by the scheduling instruction a1, and determines that the third available subframe, after the subframe where the scheduling instruction a2 is located, is a transmission subframe that is used by the scheduling instruction a2, and further the terminal performs a corresponding data transmission through above two transmission subframes.

In another implementation, the location identifier is an orthogonal sequence code that scrambles a scrambling result of the CRC scrambling of the scheduling instruction. That is to say, the scheduling instruction sent by the base station received by the terminal is: after an initial scheduling instruction is subjected to CRC scrambling, the scheduling instruction obtained by scrambling the CRC scrambling result by a orthogonal sequence, the orthogonal sequence code can ensure the location correspondence between the transmission subframe and the subframe where the scheduling instruction is located.

In a specific implementation, the scheduling location identification rule includes information that represents how to obtain the location identifier, such as a corresponding process for the scheduling instruction, and the location identifier carried by scheduling instruction is obtained. Thus, on a terminal side, after receiving the scheduling instruction, a corresponding processing operation on the scheduling instruction is performed based on the scheduling location identification rule, and the orthogonal sequence code, used in the process of generating the scheduling instruction by the base station, is to be known, that is a location identifier, and a transmission subframe is determined based on the location identifier, the subframe where the dispatch instruction is located and the scheduling location identification rule, thereby a data transmission through the determined transmission subframe is performed.

In the embodiment, a plurality of orthogonal sequence codes is set to form an orthogonal sequence group, and a number of orthogonal sequence codes in the orthogonal sequence group is related to a number of subframes that the scheduling instruction can schedule. For example, a maximum number of subframes that can be scheduled is 5, and then there are at least eight orthogonal sequence codes in the orthogonal sequence group, as shown in table 2 below, each of the orthogonal sequence codes represents a location correspondence between a transmission subframe and a subframe where the transmission subframe is located, for example, based on a subframe where the scheduling instruction is located, the subframe, the next subframe after the subframe, and the second subframe after the subframe . . . the seventh subframe after the subframe, etc.

TABLE 2 scheduling location identification rule

| | |
|---|---|
| Orthogonal sequence group | Location correspondence between the transmission subframe and the subframe where the scheduling instruction is located |
| Orthogonal sequence 1 | A subframe where the scheduling instruction is located is a transmission subframe, which is a data transmission of the subframe where the scheduling instruction is located. |
| Orthogonal sequence 2 | The first available subframe after a subframe where the scheduling instruction is located is a transmission subframe, which is a data transmission of the next available subframe after the subframe where the scheduling instruction is located. |
| Orthogonal sequence 3 | The second available subframe after a subframe where the scheduling instruction is located is a transmission subframe, which is a data transmission of the second available subframe, after the subframe where the scheduling instruction is located. |
| Orthogonal sequence 4 | The third available subframe after a subframe where the scheduling instruction is located is a transmission subframe, which is a data transmission of the third available subframe after the subframe where the scheduling instruction is located. |
| Orthogonal sequence 5 | The fourth available subframe after a subframe where the scheduling instruction is located is a transmission subframe, which is a data transmission of the fourth available subframe after the subframe where the scheduling instruction is located. |

It should be noted that the location representation of the scheduled subframe in the above table is merely one example. Based on the same reason, the scheduled subframe location may be other subframe locations.

For example, on a terminal side, after receiving the scheduling location identification rules as shown in table 2 and a scheduling instruction, a corresponding processing operation on the scheduling instruction is performed, and the orthogonal sequence code, used in the process of generating the scheduling instruction by the base station, is obtained, which is a location identifier, such as orthogonal sequence 2, therefore, according to table 2, the first available subframe, after the subframe where the scheduling instruction is located, is determined to be a transmission subframe, and a data transmission is performed through the transmission subframe; or when the location information code is orthogonal sequence 4, according to table 2, the third available subframe, after the subframe where the scheduling instruction is located, is determined to be a transmission subframe, and a data transmission is performed through the transmission subframe.

After the terminal receives the scheduling location identification rule and the instruction set including a plurality of scheduling instructions in a form of joint encoding, the terminal firstly decodes the instruction set to get each independent scheduling instruction, such as scheduling instruction b1, b2, and b3, and performs corresponding processing operations on each scheduling instruction to obtain the orthogonal sequence code used in the process of generating each scheduling instruction by the base station, such as orthogonal sequence 2 used for generating scheduling instruction b1, orthogonal sequence 3 used for generating scheduling instruction b2, orthogonal sequence 4 used for generating scheduling instruction b3, according to table 2, the terminal determines the first available subframe, after the subframe where the scheduling instruction b1 is located, is the transmission subframe that is used by the scheduling instruction b1, and determines the second available subframe, after the subframe where the scheduling instruction b2 is located, is the transmission subframe that is used by the scheduling instruction b2, and determines the third available subframe, after the subframe where the scheduling instruction b3 is located, is the transmission subframe that is used by the scheduling instruction b3, and further the terminal performs a corresponding data transmission through above three transmission subframes.

In addition, the present disclosure also provides a data transmission method, the method can be applied to a base station for performing a data transmission, such as a base station indicating that a terminal receives data in a downlink transmission; or a base station indicating that a terminal transmits data in an uplink transmission.

In the embodiment, the method may include the following steps:

The step of generating a scheduling instruction and transmitting the scheduling instruction to a terminal.

In the step of generating a scheduling instruction, the scheduling instruction carries a location identifier, the scheduling instruction is used for scheduling one or more transmission subframes, that is to say, the scheduling instruction can be a single instruction, thus a transmission subframe for a data transmission can be scheduled; or, the scheduling instruction can also be an instruction set including of a plurality of instructions, and thus a plurality of transmission subframes for data transmission can be scheduled.

In the step of transmitting the scheduling instruction to a terminal, the location identifier carried by the scheduling instruction can be: an information code directly included in the scheduling instruction, or can also be an information code represented by the scheduling instruction. Therefore, after the terminal receives the scheduling instruction, the terminal obtains a location identifier carried by the scheduling instruction, and determines a transmission subframe according to the location identifier, a subframe where the scheduling instruction is located, and a scheduling location identification rule, and transmits data through the transmission subframe.

The scheduling location identification rule includes corresponding relationships between the location identifier, the subframe where the scheduling instruction is located and the transmission subframe. In the specific implementation, the scheduling location identification rule includes: information rules for location correspondences between the subframe where the scheduling instruction, which can be represented by a location identifier, is located and the transmission subframe that needs to be found. Therefore, after the base station sends the scheduling instruction to the terminal, and after the terminal obtains the location identifier, based on the scheduling location identification rule, a location correspondence between the subframe where the scheduling instruction is located and the transmission subframe that needs to be found is identified, the scheduling instruction can be represented by a location identifier, and a transmission subframe that needs to be found is determined through the location correspondence and the location of the subframe where the scheduling instruction is located.

It should be noted that the scheduling location identification rule is an identification rule for an agreement between the base station and the terminal, that is to say, the scheduling location identification rule is sent to the terminal in advance by the base station, thus the base station and the terminal can perform data transmission based on a consistent protocol.

When the scheduling instruction is a single instruction, the scheduling instruction carries one location identifier, in the embodiment, a base station sends the generated scheduling instruction to a terminal, after the terminal receiving the scheduling instruction, the terminal obtains the location identifier, and determines a transmission subframe according to the location identifier, a subframe where the scheduling instruction is located, and a scheduling location identification rule, thus the terminal performs a data transmission through the transmission subframe, which includes transmitting data in a uplink transmission or receiving data in a downlink transmission, and purpose of this embodiment is achieved.

When there are a plurality of scheduling instructions, the plurality of scheduling instructions are sent to a terminal as an instruction set in a form of joint encoding, each of the scheduling instructions carries a location identifier, and each of the location identifiers may be the same or different, and after terminal receives the plurality of scheduling instructions, first the jointly encoded scheduling instructions are decoded, and each independent scheduling instruction is obtained, and a cross-subframe scheduling of a plurality of transmission subframes is realized through the plurality of scheduling instructions, and a data transmission of a plurality of subframes is performed, which includes transmitting data in a uplink transmission or receiving data in a downlink transmission, and the purpose of this embodiment is achieved.

Figure 3:
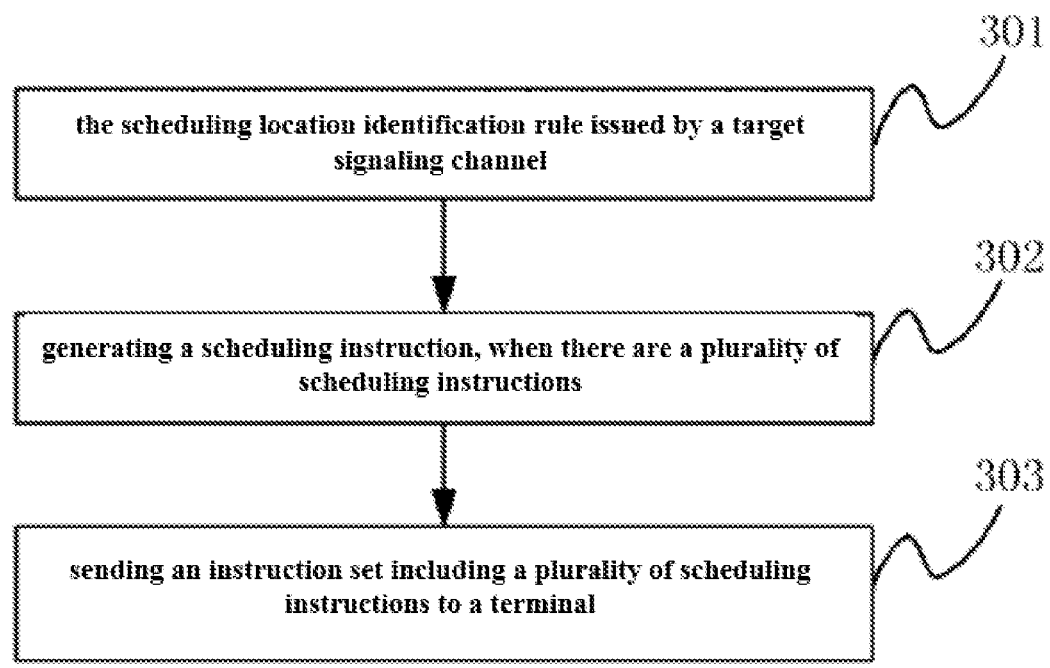
FIG. 3 is a flowchart of a data transmission method according to a third embodiment of the present disclosure.

Specifically, referring to FIG. 3, a flowchart of a data transmission method according to a third embodiment of the present disclosure is provided, the method includes the following steps:

301: issuing the scheduling location identification rule by a target signaling channel.

The target signaling channel is a Radio Resource Control (RRC) channel, a media access control (MAC) control element (CE) channel or a physical layer channel. That is to say, on the base station side, the scheduling location identification rule is issued to the terminal side by a target signaling channel.

302: generating a scheduling instruction, when there are a plurality of scheduling instructions, a instruction set includes a plurality of scheduling instructions in a form of joint encoding, each scheduling instruction carries a location identifier, and each scheduling instruction is used for scheduling a transmission subframe.

Specifically, in the embodiment, the initial plurality of scheduling instructions are jointly encoded to obtain an instruction set, and each of the scheduling instructions carries a location identifier, and each of the scheduling instructions is used for scheduling a transmission subframe.

303: sending an instruction set that contains a plurality of scheduling instructions to a terminal.

The location identifier carried by each scheduling instruction can be: an information code directly included in the scheduling instruction, or can also be an information code represented by the scheduling instruction. Therefore, after the terminal receives the instruction set, the terminal firstly decodes the instruction set to get each independent scheduling instruction, and then obtains the location identifier carried by each scheduling instruction, and determines a transmission subframe according to the location identifier, a subframe where the corresponding scheduling instruction is located, and a scheduling location identification rule, and transmits data through the transmission subframe. It should be noted that each of the transmission subframes is different.

According to the above solution, in the data transmission method provided by the third embodiment of the present disclosure, the base station carries a location identifier in each scheduling instruction, and a plurality of scheduling instructions is jointly encoded to obtain an instruction set, and instruction set is sent to a terminal, after the terminal obtains the instruction set, the terminal firstly decodes the instruction set to get each independent scheduling instruction, and then obtains the location identifier carried by each scheduling instruction, and determines a transmission subframe according to the scheduling location identification rule received from the base station in advance, which is corresponding relationships between the location identifier, the subframe where the scheduling instruction is located and the transmission subframe, and then the terminal transmits data through the transmission subframe, a data transmission across the subframes is realized, a data transmission across the subframes of a plurality of subframes is realized, and the purpose of this embodiment is achieve.

Based on the above embodiments, the location identifier can be an information code directly included in the scheduling instruction, or can also be an information code represented by the scheduling instruction.

Specifically, the location identifier is an information field located at a start location or an end location of the scheduling instruction, the length of the location identifier is at least one bit, and the length of the location identifier is fixed, the bit length in the location identifier is related to the maximum number of subframes that the scheduling instruction can schedule. As shown in the example of the scheduling location identification rule described in table 1, if the maximum number of subframes that can be scheduled by the scheduling instruction is 5, and then the length of the location identifier is 3 bits (5 does not exceed 8, but is greater than 4).

For example, on a terminal side, a location identifier 010 is added at the start or end of one schedule instruction, after receiving the scheduling location identification rules as shown in table 1 and a scheduling instruction, at a fixed location on the scheduling instruction, for example obtaining a location identifier of 3 bits at a start location or an end location, such as code 010, therefore, according to table 1, the second available subframe after the subframe where the scheduling instruction is located is determined to be a transmission subframe, and a data transmission is performed through the transmission subframe; on a terminal side, a location identifier is added at the start or end of one schedule instruction 100, after receiving the scheduling location identification rules as shown in table 1 and a scheduling instruction, at a fixed location on the scheduling instruction, for example obtaining a location identifier of 3 bits at a start location or an end location, such as code 010, therefore, according to table 1, the third available subframe after the subframe where the scheduling instruction is located is determined to be a transmission subframe, and a data transmission is performed through the transmission subframe.

Another example, on a base station side, a location identifier 010 is added at the start or end of a schedule instruction a1, a location identifier 011 is added at the start or end of a schedule instruction a2, the base station jointly encodes above two scheduling instructions to obtain an instruction set and sends instruction set to a terminal, after the terminal receives the scheduling location identification rule and the instruction set including a plurality of scheduling instructions in a form of joint encoding, the terminal firstly decodes the instruction set to get each independent scheduling instruction, such as scheduling instruction a1 and a2, and then at a corresponding location on each scheduling instruction, such as the location identifier of 3 bits obtained at a start location, such as the location identifier of 3 bits obtained at a start location of scheduling instruction a1: 010, the location identifier of 3 bits obtained at a start location of scheduling instruction a2: 011, according to table 1, the terminal determines that the second available subframe, after the subframe where the scheduling instruction a1 is located, is the transmission subframe that is used by the scheduling instruction a1, and determines that the third available subframe, after the subframe where the scheduling instruction a2 is located, is a transmission subframe that is used by the scheduling instruction a2, and further the terminal performs a corresponding data transmission through above two transmission subframes.

In another implementation, the location identifier is an orthogonal sequence code that scrambles a scrambling result of the CRC scrambling of the scheduling instruction. In the embodiment, the base station sets a plurality of orthogonal sequence codes to form an orthogonal sequence group, and a number of orthogonal sequence codes in the orthogonal sequence group is related to a number of subframes that the scheduling instruction can schedule, for example, a maximum number of subframes that can be scheduled is 5, and then there are at least eight orthogonal sequence codes in the orthogonal sequence group, as shown in table 2 below, each of the orthogonal sequence codes represents a location correspondence between a transmission subframe and a subframe where the transmission subframe is located, for example, based on a subframe where the scheduling instruction is located, the subframe, the next subframe after the subframe, and the second subframe after the subframe . . . the seventh subframe after the subframe, etc.

For example, on a base station side, the base station performs scrambling on a result of CRC scrambling for initial scheduling instructions by orthogonal sequence code 2, and transmits a scheduling instruction after scrambling to a terminal, on the terminal side, after receiving the scheduling location identification rules as shown in table 2 and a scheduling instruction, a corresponding processing operation on the scheduling instruction is performed, and the orthogonal sequence code 2, used in the process of generating the scheduling instruction by the base station, is obtained, which is a location identifier, therefore, according to table 2, the first available subframe, after the subframe where the scheduling instruction is located, is determined to be a transmission subframe, and a data transmission is performed through the transmission subframe; or on the base station side, the base station performs scrambling on a result of CRC scrambling for initial scheduling instructions by orthogonal sequence code 4, and transmits a scheduling instruction after scrambling to a terminal, on the terminal side, after receiving the scheduling location identification rules as shown in table 2 and a scheduling instruction, a corresponding processing operation on the scheduling instruction is performed, and the orthogonal sequence code 4, used in the process of generating the scheduling instruction by the base station, is obtained, which is a location identifier, therefore, according to table 2, the third available subframe, after the subframe where the scheduling instruction is located, is determined to be a transmission subframe, and a data transmission is performed through the transmission subframe.

Another example, on a base station side, the base station performs scrambling on a result of CRC scrambling for initial scheduling instruction b1 by orthogonal sequence code 2, performs scrambling on a result of CRC scrambling for initial scheduling instruction b2 by orthogonal sequence code 3, performs scrambling on a result of CRC scrambling for initial scheduling instruction b3 by orthogonal sequence code 4, and then, the scrambled scheduling instruction b1, b2, b3 is jointly encoded to obtain an instruction set, and the instruction set is sent to the terminal. After the terminal receives the scheduling location identification rule and the instruction set including a plurality of scheduling instructions in a form of joint encoding, the terminal firstly decodes the instruction set to get each independent scheduling instruction, such as scheduling instruction b1, b2, and b3, and performs corresponding processing operations on each scheduling instruction to obtain the orthogonal sequence code used in the process of generating each scheduling instruction by the base station, such as orthogonal sequence 2 used for generating scheduling instruction b1, orthogonal sequence 3 used for generating scheduling instruction b2, orthogonal sequence 4 used for generating scheduling instruction b3, according to table 2, the terminal determines the first available subframe, after the subframe where the scheduling instruction b1 is located, is the transmission subframe that is used by the scheduling instruction b1, and determines the second available subframe, after the subframe where the scheduling instruction b2 is located, is the transmission subframe that is used by the scheduling instruction b2, and determines the third available subframe, after the subframe where the scheduling instruction b3 is located, is the transmission subframe that is used by the scheduling instruction b3, and further the terminal performs a corresponding data transmission through above three transmission subframes.

Figure 4:
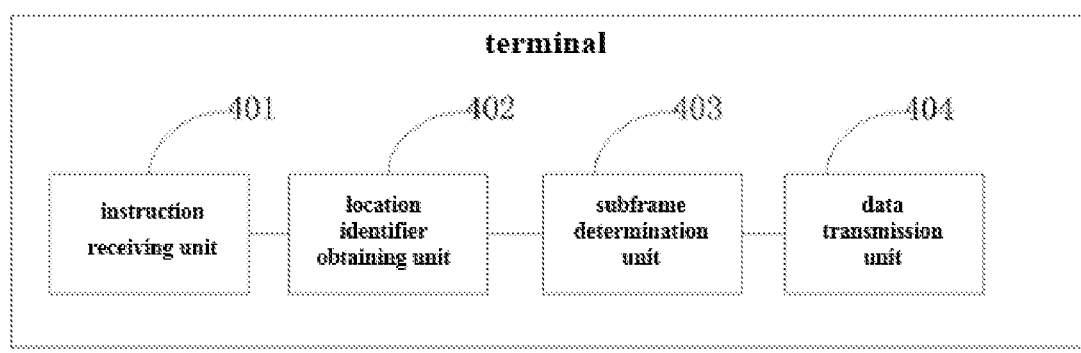
FIG. 4 is a schematic structural diagram of a terminal according to a fourth embodiment of the present disclosure.

Referring to FIG. 4, a schematic structural diagram of a terminal according to a fourth embodiment of the present disclosure is provided, the terminal can be a terminal for performing a data transmission, such as a terminal for receiving data in a downlink transmission or a terminal for sending data in a uplink transmission.

Specifically, in the embodiment, the terminal may include the following structure:

An instruction receiving unit 401 configured to receive a scheduling instruction issued by a base station.

The scheduling instruction carries a location identifier, and the scheduling instruction is used for scheduling one or more transmission subframes, that is to say, the scheduling instruction can be a single instruction, thus a transmission subframe for a data transmission can be scheduled; or, the scheduling instruction can also be an instruction set including of a plurality of instructions, thus a plurality of transmission subframes for data transmission can be scheduled.

It should be noted that the scheduling instruction is generated and sent by a base station, so that the terminal can receive the scheduling instruction.

A location identifier obtaining unit 402 configured to obtain the location identifier.

The location identifier can be an information code directly included in the scheduling instruction, or can also be an information code represented by the scheduling instruction. Therefore, after receiving the scheduling instruction, the terminal obtains a location identifier carried by the scheduling instruction.

A subframe determination unit 403 configured to determine a transmission subframe according to the location identifier, a subframe where the scheduling instruction is located, and a scheduling location identification rule.

The scheduling location identification rule includes corresponding relationships between the location identifier, the subframe where the scheduling instruction is located and the transmission subframe.

Specifically, the scheduling location identification rule includes: information rules for location correspondences between the subframe where the scheduling instruction, which can be represented by a location identifier, is located and the transmission subframe that needs to be found. Therefore, in one embodiment, after obtaining the location identifier carried by the scheduling instruction, based on the scheduling location identification rule, a location correspondence between the subframe where the scheduling instruction is located and the transmission subframe that needs to be found is identified, the scheduling instruction can be represented by a location identifier, and a transmission subframe that needs to be found is determined through the location correspondence and the location of the subframe where the scheduling instruction is located.

It should be noted that the scheduling location identification rule is an identification rule for an agreement between the base station and the terminal, that is to say, the scheduling location identification rule is sent to the terminal in advance by the base station, thus the base station and the terminal can perform data transmission based on a consistent protocol.

A data transmission unit 404 configured to transmit data through the transmission subframe.

Specifically, in the embodiment, the transmission subframe is used for receiving data or transmitting data, for example, in a downlink transmission, the terminal uses the transmission subframe for receiving data; in a uplink transmission, the terminal uses the transmission subframe for transmitting data.

According to the above solution, in the terminal provided by the fourth embodiment of the present disclosure, after receiving the scheduling instruction sent by the base station, the location identifier carried by the scheduling instruction is obtained, and based on the location identifier and the scheduling location identification rule, which includes the location correspondence between the transmission subframe and the subframe where the scheduling instruction is located, a transmission subframe is determined, and then a data transmission is performed through the transmission subframe, thus, a data transmission across the subframes is realized, and the purpose of this embodiment is achieved.

It should be noted that when the scheduling instruction is a single instruction, the scheduling instruction carries one location identifier, in one embodiment, after the terminal receives the scheduling instruction, the location identifier carried by the scheduling instruction is obtained, and according to the location identifier, the subframe where the scheduling instruction is located, and the scheduling location identification rule a transmission subframe is determined, and then a data transmission is performed through the transmission subframe, which includes transmitting data in a uplink transmission or receiving data in a downlink transmission, and the purpose of this embodiment is achieved.

In addition, when there are a plurality of scheduling instructions, the plurality of scheduling instructions are received as an instruction set in a form of joint encoding, that is to say, after the base station jointly encodes the plurality of scheduling instructions, a instruction set is obtained, and then the instruction set in the form of joint coding is sent to the terminal. Each of the plurality of scheduling instructions of the instruction set received by the terminal carries a location identifier, each of the scheduling instructions carries a location identifier, and each of the location identifiers may be the same or different, and after the terminal receives the instruction set including a plurality of scheduling instructions, first the jointly encoded scheduling instructions are decoded, and each independent scheduling instruction is obtained, and a cross-subframe scheduling of a plurality of transmission subframes is realized through the plurality of scheduling instructions, and a data transmission of a plurality of subframes is performed, which includes transmitting data in a uplink transmission or receiving data in a downlink transmission, and the purpose of this embodiment is achieved.

Figure 5:
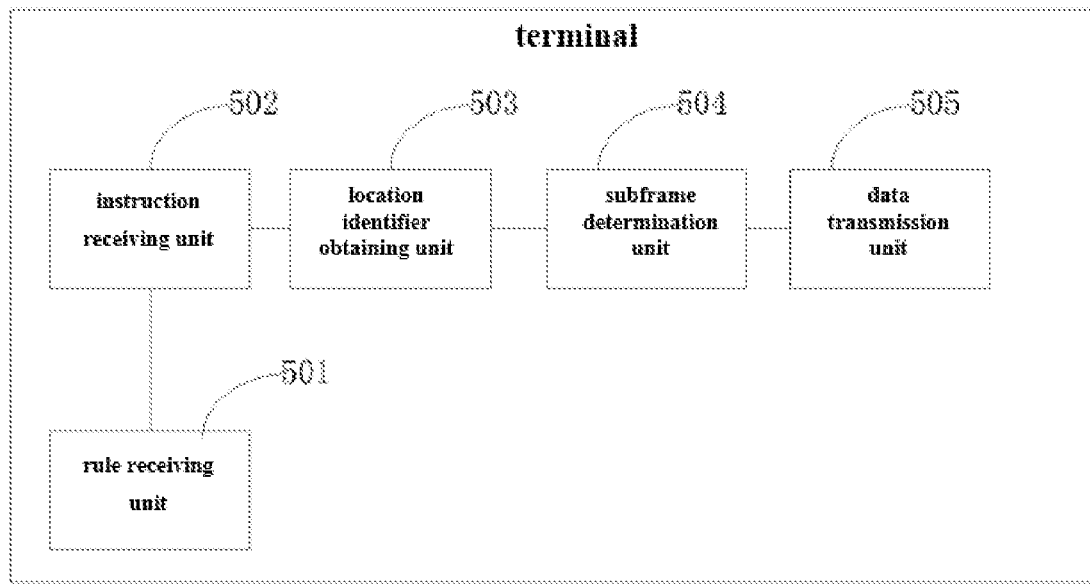
FIG. 5 is a schematic structural diagram of a terminal according to a fifth embodiment of the present disclosure.

Specifically, referring to FIG. 5, a schematic structural diagram of a terminal according to a fifth embodiment of the present disclosure is provided, the terminal may include the following structure:

A rule receiving unit 501 configured to receive the scheduling location identification rule issued by the base station through a target signaling channel.

The target signaling channel is a Radio Resource Control (RRC) channel, a media access control (MAC) control element (CE) channel or a physical layer channel. That is to say, on the terminal side, the terminal of the embodiment receives the scheduling location identification rule issued by the base station through a Radio Resource Control (RRC) channel, a media access control (MAC) control element (CE) channel or a physical layer channel.

A instruction receiving unit 502 configured to receive an instruction set issued by the base station. The instruction set includes a plurality of scheduling instructions, and the plurality of scheduling instructions are in a form of joint encoding, each scheduling instruction carries a location identifier, and each scheduling instruction is used for scheduling a transmission subframe.

Specifically, after the instruction receiving unit 502 receives an instruction set in a form of joint encoding, it is necessary to decode the jointly encoded instruction set to obtain each of the scheduling instructions.

A location identifier obtaining unit 503 configured to obtain the location identifier carried by the scheduling instruction.

A subframe determination unit 504 configured to determine a transmission subframe corresponding to the location identifier carried by each of the scheduling instructions, according to a location identifier carried by each of the scheduling instructions, a subframe where the corresponding scheduling instruction is located, and the scheduling location identification rule.

The scheduling location identification rule includes corresponding relationships between the location identifier, the subframe where the scheduling instruction is located and the transmission subframe.

Specifically, the scheduling location identification rule includes: information rules for location correspondences between the subframe where the scheduling instruction, which can be represented by each location identifier, is located and the transmission subframe that needs to be found. Therefore, in one embodiment, after obtaining each location identifier, based on the scheduling location identification rule, a location correspondence between the subframe where the scheduling instruction is located and the transmission subframe that needs to be found is identified, the scheduling instruction can be represented by each location identifier, and a transmission subframe that needs to be found by the location correspondence and the location of the subframe where each scheduling instruction is located, is determined.

A data transmission unit 505 configured to transmit data through a plurality of the determined transmission subframes.

Specifically, in the embodiment, the transmission subframe is used for receiving data or transmitting data, for example, in a downlink transmission, the terminal uses the transmission subframe for receiving data; in a uplink transmission, the terminal uses the transmission subframe for transmitting data.

According to the above solution, in the terminal provided by the fifth embodiment of the present disclosure, after receiving an instruction set including a plurality of scheduling instructions issued by the base station, the instruction set is decoded, and each independent scheduling instruction is obtained, thus the location identifier carried by each scheduling instruction is obtained, and a transmission subframe is found based on the location identifier and the scheduling location identification rule received from the base station, the scheduling location identification rule including the location correspondence between a transmission subframe and a subframe where the scheduling instruction is located, and then a data transmission is performed through the transmission subframe, a data transmission across the subframes is realized, and the purpose of this embodiment is achieved.

Based on the above embodiments, the location identifier can be an information code directly included in the scheduling instruction, or can also be an information code represented by the scheduling instruction, the following describes the existence form of the location identifier:

In one implementation, the location identifier is an information field located at a start location or an end location of the scheduling instruction, the length of the location identifier is at least one bit, and the length of the location identifier is fixed. Correspondingly, in the implementation, when the location identifier is obtained, the location identifier is directly obtained from an information field of a start location or an end location of the scheduling instruction.

Specifically, a location of the location identifier in the scheduling instruction is fixed, and a bit length in the location identifier is fixed, either at the start location or at the end location, so that after the terminal receives the scheduling instruction, the location identifier can be obtained directly at the location, and then a transmission subframe is determined according to the location identifier, the subframe where the scheduling instruction is located and the scheduling location identification rule, thus a data transmission is performed through the transmission subframe, a data transmission across the subframes of a plurality of subframes is realized, and the purpose of this embodiment is achieved.

In a specific implementation, the scheduling location identification rule includes information that represents how to obtain the location identifier, such as location information of the location identifier in the scheduling instruction, at the start location or end location, and the bit length information, etc. For example, the scheduling location identification rule includes: a location identifier located at a start location of the scheduling instruction, a bit length of the location identifier, etc.; or the scheduling location identification rule includes: a location identifier located at a end location of the scheduling instruction, a bit length of the location identifier, etc. Thus the terminal can obtain the location identifier based on the information after receiving the scheduling instruction, and then determine a transmission subframe according to the location identifier, the subframe where the scheduling instruction is located and the scheduling location identification rule, thus a data transmission through the transmission subframe is performed, and a data transmission by the transmission subframe is performed.

It should be noted that the bit length in the location identifier is related to a maximum number of subframes that the scheduling instruction can schedule. For example, if a number of subframes that can be scheduled by the scheduling instruction is 8, then a length of the bits in the location identifier is 3, that is, there are 3 bits in the location identifier. A bit value in the location identifier can be used to represent a location correspondence between the transmission subframe and the subframe where the scheduling instruction is located, for example, based on a subframe where the scheduling instruction is located, the subframe, the next subframe after the subframe, and the second subframe after the subframe . . . the seventh subframe after the subframe, etc.

In another implementation, the location identifier is an orthogonal sequence code that scrambles a scrambling result of the CRC scrambling of the scheduling instruction. That is to say, the scheduling instruction sent by the base station received by the terminal is: after an initial scheduling instruction is subjected to CRC scrambling, the scheduling instruction obtained by scrambling the CRC scrambling result by a orthogonal sequence, the orthogonal sequence code can ensure the location correspondence between the transmission subframe and the subframe where the scheduling instruction is located.

In a specific implementation, the scheduling location identification rule includes information that represents how to obtain the location identifier, such as a corresponding process for the scheduling instruction, and the location identifier carried by scheduling instruction is obtained. Thus, on a terminal side, after receiving the scheduling instruction, a corresponding processing operation on the scheduling instruction is performed based on the scheduling location identification rule, and the orthogonal sequence code, used in the process of generating the scheduling instruction by the base station, is to be known, that is a location identifier, and a transmission subframe is determined based on the location identifier, the subframe where the dispatch instruction is located and the scheduling location identification rule, thereby a data transmission through the determined transmission subframe is performed.

In the embodiment, a plurality of orthogonal sequence codes are set to form an orthogonal sequence group, and a number of orthogonal sequence codes in the orthogonal sequence group is related to a number of subframes that the scheduling instruction can schedule, for example, a maximum number of subframes that can be scheduled is 5, and then there are at least eight orthogonal sequence codes in the orthogonal sequence group, as shown in table 2 below, each of the orthogonal sequence codes represents a location correspondence between a transmission subframe and a subframe where the transmission subframe is located, for example, based on a subframe where the scheduling instruction is located, the subframe, the next subframe after the subframe, and the second subframe after the subframe . . . the seventh subframe after the subframe, etc.

In addition, the present disclosure also provides a base station, weights, the base station can be a base station for performing a data transmission, such as a base station indicating that a terminal receives data in a downlink transmission; or a base station indicating that a terminal transmits data in a uplink transmission.

In the embodiment, the base station may be used for:

generating a scheduling instruction, and sending the scheduling instruction to a terminal.

The scheduling instruction generated by the base station carries a location identifier, the scheduling instruction is used for scheduling one or more transmission subframes, that is to say, the scheduling instruction can be a single instruction, thus a transmission subframe for a data transmission can be scheduled; or, the scheduling instruction can also be an instruction set including of a plurality of instructions, and thus a plurality of transmission subframes for data transmission can be scheduled.

The location identifier carried by the scheduling instruction can be: an information code directly included in the scheduling instruction, or can also be an information code represented by the scheduling instruction. Therefore, after the terminal receives the scheduling instruction, the terminal obtains a location identifier carried by the scheduling instruction, and determines a transmission subframe according to the location identifier, a subframe where the scheduling instruction is located, and a scheduling location identification rule, and transmits data through the transmission subframe.

The scheduling location identification rule includes corresponding relationships between the location identifier, the subframe where the scheduling instruction is located and the transmission subframe. In the specific implementation, the scheduling location identification rule includes: information rules for location correspondences between the subframe where the scheduling instruction, which can be represented by a location identifier, is located and the transmission subframe that needs to be found. Therefore, after the base station sends the scheduling instruction to the terminal, and after the terminal obtains the location identifier, based on the scheduling location identification rule, a location correspondence between the subframe where the scheduling instruction is located and the transmission subframe that needs to be found is identified, the scheduling instruction can be represented by a location identifier, and a transmission subframe that needs to be found is determined through the location correspondence and the location of the subframe where the scheduling instruction is located.

It should be noted that the scheduling location identification rule is an identification rule for an agreement between the base station and the terminal, that is to say, the scheduling location identification rule is sent to the terminal in advance by the base station, thus the base station and the terminal can perform data transmission based on a consistent protocol.

When the scheduling instruction is a single instruction, the scheduling instruction carries one location identifier, in the embodiment, a base station sends the generated scheduling instruction to a terminal, after the terminal receiving the scheduling instruction, the terminal obtains the location identifier, and determines a transmission subframe according to the location identifier, a subframe where the scheduling instruction is located, and a scheduling location identification rule, thus the terminal performs a data transmission through the transmission subframe, which includes transmitting data in a uplink transmission or receiving data in a downlink transmission, and purpose of this embodiment is achieved.

When there are a plurality of scheduling instructions, the plurality of scheduling instructions are sent to a terminal as an instruction set in a form of joint encoding, each of the scheduling instructions carries a location identifier, and each of the location identifiers may be the same or different, and after terminal receives the plurality of scheduling instructions, first the jointly encoded scheduling instructions are decoded, and each independent scheduling instruction is obtained, and a cross-subframe scheduling of a plurality of transmission subframes is realized through the plurality of scheduling instructions, and a data transmission of a plurality of subframes is performed, which includes transmitting data in a uplink transmission or receiving data in a downlink transmission, and the purpose of this embodiment is achieved.

Figure 6:
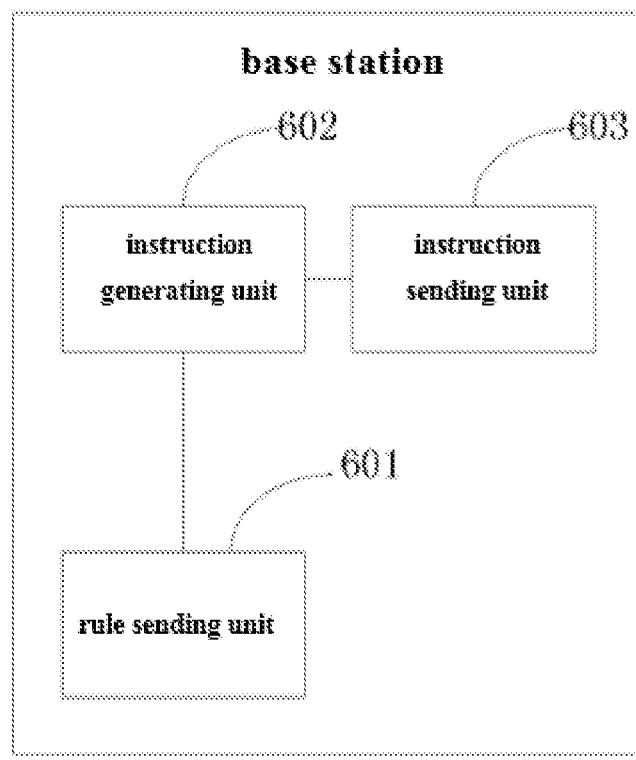
FIG. 6 is a schematic structural diagram of a base station according to a sixth embodiment of the present disclosure.

Specifically, referring to FIG. 6, a schematic structural diagram of a base station according to a sixth embodiment of the present disclosure is provided, the base station may include the following structure:

A rule sending unit 601 configured to send a scheduling location identification rule to a terminal through a target signaling channel.

The target signaling channel is a Radio Resource Control (RRC) channel, a media access control (MAC) control element (CE) channel or a physical layer channel. That is to say, on the base station side, the scheduling location identification rule is issued to the terminal side by a target signaling channel.

A instruction generating unit 602 configured to generate a scheduling instruction, when there are a plurality of scheduling instructions, a instruction set includes a plurality of scheduling instructions in a form of joint encoding, each scheduling instruction carries a location identifier, and each scheduling instruction is used for scheduling a transmission subframe.

Specifically, in the embodiment, the initial plurality of scheduling instructions are jointly encoded to obtain an instruction set, and each of the scheduling instructions carries a location identifier, and each of the scheduling instructions is used for scheduling a transmission subframe.

A instruction sending unit 603 configured to send the scheduling instruction to a terminal.

The location identifier carried by each scheduling instruction can be: an information code directly included in the scheduling instruction, or can also be an information code represented by the scheduling instruction. Therefore, after the terminal receives the instruction set, the terminal firstly decodes the instruction set to get each independent scheduling instruction, and then obtains the location identifier carried by each scheduling instruction, and determines a transmission subframe according to the location identifier, a subframe where the corresponding scheduling instruction is located, and a scheduling location identification rule, and transmits data through the transmission subframe. It should be noted that each of the transmission subframes is different.

According to the above solution, in the base station provided by the sixth embodiment of the present disclosure, the base station carries a location identifier in each scheduling instruction, and a plurality of scheduling instructions is jointly encoded to obtain an instruction set, and instruction set is sent to a terminal, after the terminal obtains the instruction set, the terminal firstly decodes the instruction set to get each independent scheduling instruction, and then obtains the location identifier carried by each scheduling instruction, and determines a transmission subframe according to the scheduling location identification rule received from the base station in advance, which is corresponding relationships between the location identifier, the subframe where the scheduling instruction is located and the transmission subframe, and then the terminal transmits data through the transmission subframe, a data transmission across the subframes is realized, a data transmission across the subframes of a plurality of subframes is realized, and the purpose of this embodiment is achieve.

Based on the above embodiments, the location identifier can be an information code directly included in the scheduling instruction, or can also be an information code represented by the scheduling instruction.

Specifically, the location identifier is an information field located at a start location or an end location of the scheduling instruction, the length of the location identifier is at least one bit, and the length of the location identifier is fixed, the bit length in the location identifier is related to the maximum number of subframes that the scheduling instruction can schedule. As shown in the example of the scheduling location identification rule described in table 1, if the maximum number of subframes that can be scheduled by the scheduling instruction is 5, and then the length of the location identifier is 3 bits (5 does not exceed 8, but is greater than 4).

For example, on a terminal side, a location identifier 010 is added at the start or end of one schedule instruction, after receiving the scheduling location identification rules as shown in table 1 and a scheduling instruction, at a fixed location on the scheduling instruction, for example obtaining a location identifier of 3 bits at a start location or an end location, such as code 010, therefore, according to table 1, the second available subframe after the subframe where the scheduling instruction is located is determined to be a transmission subframe, and a data transmission is performed through the transmission subframe; on a terminal side, a location identifier is added at the start or end of one schedule instruction 100, after receiving the scheduling location identification rules as shown in table 1 and a scheduling instruction, at a fixed location on the scheduling instruction, for example obtaining a location identifier of 3 bits at a start location or an end location, such as code 010, therefore, according to table 1, the third available subframe after the subframe where the scheduling instruction is located is determined to be a transmission subframe, and a data transmission is performed through the transmission subframe.

Another example, on a base station side, a location identifier 010 is added at the start or end of a schedule instruction a1, a location identifier 011 is added at the start or end of a schedule instruction a2, the base station jointly encodes above two scheduling instructions to obtain an instruction set and sends instruction set to a terminal, after the terminal receives the scheduling location identification rule and the instruction set including a plurality of scheduling instructions in a form of joint encoding, the terminal firstly decodes the instruction set to get each independent scheduling instruction, such as scheduling instruction a1 and a2, and then at a corresponding location on each scheduling instruction, such as the location identifier of 3 bits obtained at a start location, such as the location identifier of 3 bits obtained at a start location of scheduling instruction a1: 010, the location identifier of 3 bits obtained at a start location of scheduling instruction a2: 011, according to table 1, the terminal determines that the second available subframe, after the subframe where the scheduling instruction a1 is located, is the transmission subframe that is used by the scheduling instruction a1, and determines that the third available subframe, after the subframe where the scheduling instruction a2 is located, is a transmission subframe that is used by the scheduling instruction a2, and further the terminal performs a corresponding data transmission through above two transmission subframes.

In another implementation, the location identifier is an orthogonal sequence code that scrambles a scrambling result of the CRC scrambling of the scheduling instruction. In the embodiment, the base station sets a plurality of orthogonal sequence codes to form an orthogonal sequence group, and a number of orthogonal sequence codes in the orthogonal sequence group is related to a number of subframes that the scheduling instruction can schedule, for example, a maximum number of subframes that can be scheduled is 5, and then there are at least eight orthogonal sequence codes in the orthogonal sequence group, as shown in Table 2 below, each of the orthogonal sequence codes represents a location correspondence between a transmission subframe and a subframe where the transmission subframe is located, for example, based on a subframe where the scheduling instruction is located, the subframe, the next subframe after the subframe, and the second subframe after the subframe . . . the seventh subframe after the subframe, etc.

For example, on a base station side, the base station performs scrambling on a result of CRC scrambling for initial scheduling instructions by orthogonal sequence code 2, and transmits a scheduling instruction after scrambling to a terminal, on the terminal side, after receiving the scheduling location identification rules as shown in table 2 and a scheduling instruction, a corresponding processing operation on the scheduling instruction is performed, and the orthogonal sequence code 2, used in the process of generating the scheduling instruction by the base station, is obtained, which is a location identifier, therefore, according to table 2, the first available subframe, after the subframe where the scheduling instruction is located, is determined to be a transmission subframe, and a data transmission is performed through the transmission subframe; or on the base station side, the base station performs scrambling on a result of CRC scrambling for initial scheduling instructions by orthogonal sequence code 4, and transmits a scheduling instruction after scrambling to a terminal, on the terminal side, after receiving the scheduling location identification rules as shown in table 2 and a scheduling instruction, a corresponding processing operation on the scheduling instruction is performed, and the orthogonal sequence code 4, used in the process of generating the scheduling instruction by the base station, is obtained, which is a location identifier, therefore, according to table 2, the third available subframe, after the subframe where the scheduling instruction is located, is determined to be a transmission subframe, and a data transmission is performed through the transmission subframe.

Another example, on a base station side, the base station performs scrambling on a result of CRC scrambling for initial scheduling instruction b1 by orthogonal sequence code 2, performs scrambling on a result of CRC scrambling for initial scheduling instruction b2 by orthogonal sequence code 3, performs scrambling on a result of CRC scrambling for initial scheduling instruction b3 by orthogonal sequence code 4, and then, the scrambled scheduling instruction b1, b2, b3 is jointly encoded to obtain an instruction set, and the instruction set is sent to the terminal. After the terminal receives the scheduling location identification rule and the instruction set including a plurality of scheduling instructions in a form of joint encoding, the terminal firstly decodes the instruction set to get each independent scheduling instruction, such as scheduling instruction b1, b2, and b3, and performs corresponding processing operations on each scheduling instruction to obtain the orthogonal sequence code used in the process of generating each scheduling instruction by the base station, such as orthogonal sequence 2 used for generating scheduling instruction b1, orthogonal sequence 3 used for generating scheduling instruction b2, orthogonal sequence 4 used for generating scheduling instruction b3, according to table 2, the terminal determines the first available subframe, after the subframe where the scheduling instruction b1 is located, is the transmission subframe that is used by the scheduling instruction b1, and determines the second available subframe, after the subframe where the scheduling instruction b2 is located, is the transmission subframe that is used by the scheduling instruction b2, and determines the third available subframe, after the subframe where the scheduling instruction b3 is located, is the transmission subframe that is used by the scheduling instruction b3, and further the terminal performs a corresponding data transmission through above three transmission subframes.

Figure 7:
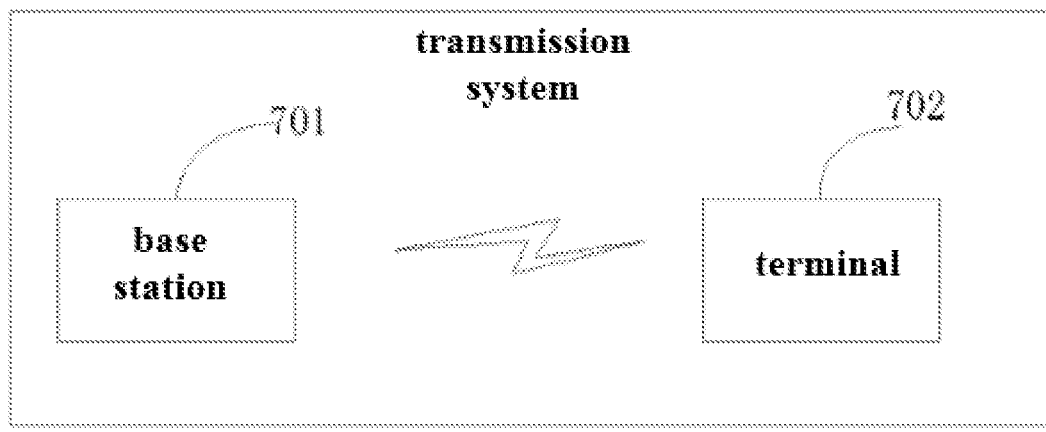
FIG. 7 is a schematic structural diagram of a data transmission system according to a seventh embodiment of the present disclosure.

Referring to FIG. 7, a schematic structural diagram of a data transmission system according to a seventh embodiment of the present disclosure is provided, the data transmission system may include: a base station 701 and a terminal 702:

The base station 701 generating a scheduling instruction.

The scheduling instruction carries a location identifier, the scheduling instruction is used for scheduling one or more transmission subframes, that is to say, the scheduling instruction can be a single instruction, thus a transmission subframe for a data transmission can be scheduled; or, the scheduling instruction can also be an instruction set including of a plurality of instructions, and thus a plurality of transmission subframes for data transmission can be scheduled.

It should be noted, the location identifier can be an information code directly included in the scheduling instruction, such as a location identifier is an information field located at a start location or an end location of the scheduling instruction; the location identifier also can be an information code represented by the scheduling instruction, for example, in the process of generating a scheduling instruction by the base station, an orthogonal sequence code that scrambles a scrambling result of the CRC scrambling of the scheduling instruction by the base station.

The base station 701 sends the schedule instruction to the terminal 702.

The terminal 702 obtains the location identifier after receiving the scheduling instruction, and determines a transmission subframe according to the location identifier, the subframe where the scheduling instruction is located, and a scheduling location identification rule, and then transmits data through the transmission subframe.

The scheduling location identification rule includes corresponding relationships between the location identifier, the subframe where the scheduling instruction is located and the transmission subframe.

Specifically, the scheduling location identification rule includes: information rules for location correspondences between the subframe where the scheduling instruction, which can be represented by a location identifier, is located and the transmission subframe that needs to be found. Therefore, in one embodiment, after obtaining the location identifier carried by the scheduling instruction, based on the scheduling location identification rule, a location correspondence between the subframe where the scheduling instruction is located and the transmission subframe that needs to be found is identified, the scheduling instruction can be represented by a location identifier, and a transmission subframe that needs to be found is determined through the location correspondence and the location of the subframe where the scheduling instruction is located.

It should be noted that the scheduling location identification rule is an identification rule for an agreement between the base station and the terminal, thus the base station and the terminal can perform data transmission based on a consistent protocol, for example, the scheduling location identification rule is sent to the terminal in advance by the base station through a Radio Resource Control (RRC) channel, a media access control (MAC) control element (CE) channel or a physical layer channel signaling.

According to the above solution, in the data transmission system provided by the seventh embodiment of the present disclosure, a scheduling instruction is issued to the terminal through the base station, after the terminal receiving the scheduling instruction, the location identifier carried by the scheduling instruction is obtained, and based on the location identifier and the scheduling location identification rule, which includes the location correspondence between the transmission subframe and the subframe where the scheduling instruction is located, a transmission subframe is determined, and then a data transmission is performed through the transmission subframe, thus, a data transmission across the subframes is realized, and the purpose of this embodiment is achieved.

It should be noted that other specific implementations in the embodiment may refer to related embodiments, and will not be described in detail here.

In the above transmission system, the scheduling instruction generated by the base station 701 can be a single instruction, the scheduling instruction carries one location identifier, in the embodiment, the base station 701 sends the generated scheduling instructions to the terminal 702, after the terminal 702 receives the scheduling instruction, the terminal obtains the location identifier, and determines a transmission subframe according to the location identifier, a subframe where the scheduling instruction is located, and a scheduling location identification rule, and then a data transmission is performed through the transmission subframe, which includes transmitting data in a uplink transmission or receiving data in a downlink transmission, and the purpose of this embodiment is achieved.

In addition, when there may be a plurality of scheduling instructions generated by the base station 701, correspondingly, the base station 701 jointly encodes the plurality of scheduling instructions to obtain a instruction set and sends the instruction set to the terminal 702, each of the scheduling instructions carries a location identifier, after the terminal 702 receives the instruction set including a plurality of scheduling instructions, first the jointly encoded scheduling instructions are decoded, and each independent scheduling instruction is obtained, and a cross-subframe scheduling of a plurality of transmission subframes is realized through the plurality of scheduling instructions, and a data transmission of a plurality of subframes is performed, which includes transmitting data in a uplink transmission or receiving data in a downlink transmission, and the purpose of this embodiment is achieved.

Figure 8:
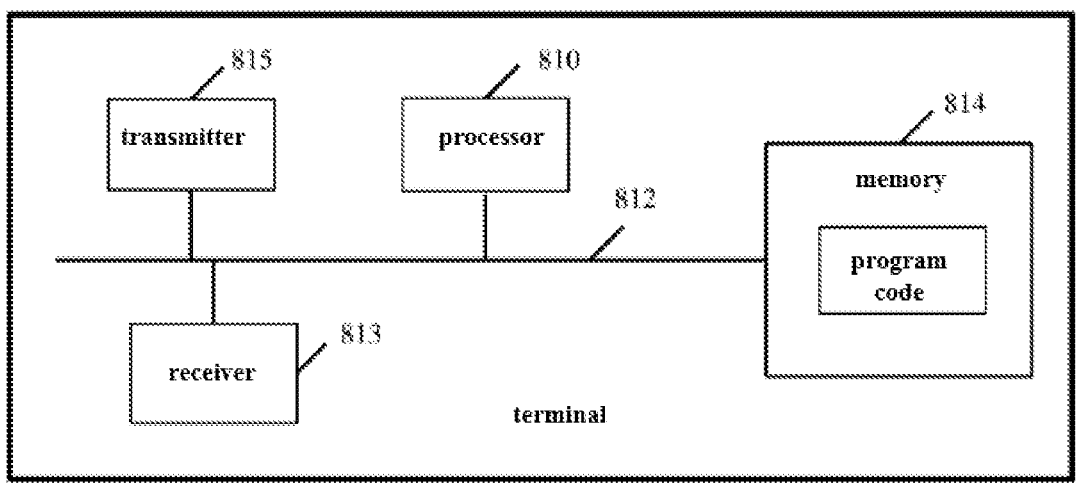
FIG. 8 is a schematic structural diagram of a terminal according to an eighth embodiment of the present disclosure.

FIG. 8 is a schematic structural diagram of a terminal according to an eighth embodiment of the present disclosure is provided. The terminal in the disclosure may be different types of electronic devices, such as: smart phones, tablet computers, palmtop computers, and mobile internet devices, personal digital assistants, media players, smart televisions, smart watches, smart glasses, smart bracelets, and so on. The terminal in embodiment 8 includes at least one processor 810, such as a CPU, at least one receiver 813, at least one memory 814, at least one transmitter 815, and at least one communication bus 812. The communication bus 812 is used to implement connection communication between these components. The receiver 813 and the transmitter 815 may be wired transmission ports, or may be wireless devices, for example, including antenna devices for performing data communication with other devices. The memory 814 may be a high speed RAM memory or a non-volatile memory such as at least one disk memory.

The processor 810 can execute an operating system of the terminal and various installed application programs, program codes, and so on. For example, each unit described above includes the instruction receiving unit 401, the location identifier obtaining unit 402, and so on.

Program code is stored in the memory 814, and the processor 810 can schedule program code stored in the memory 814 to perform related functions through the communication bus 812. For example, the various units (such as the instruction receiving unit 401, location identifier obtaining unit 402, etc) described in FIG. 4 and FIG. 5 are program code stored in a memory 814 and executed by a processor 810 to implement the functions of the various units for a data transmission.

In one embodiment of the disclosure, the memory 814 stores a plurality of instructions that are executed by the processor 810 to implement a data transmission method. Specifically the execution of the plurality of instructions by the processor includes: receives a scheduling instruction issued by a base station, the scheduling instruction carrying a location identifier, and the scheduling instruction being used for scheduling one or more transmission subframes; obtains the location identifier; determines a transmission subframe according to the location identifier, a subframe where the scheduling instruction is located, and a scheduling location identification rule, the scheduling location identification rule including corresponding relationships between the location identifier, the subframe where the scheduling instruction is located and the transmission subframe; transmits data through the transmission subframe.

In a further embodiment, the location identifier is an information field located at a start location or an end location of the scheduling instruction, a length of the location identifier is at least one bit, and a length of the location identifier is fixed.

In a further embodiment, the location identifier is an orthogonal sequence that scrambles a scrambling result of the scheduling instruction through a cyclic redundancy check (CRC) scrambling.

In a further embodiment, when there are a plurality of scheduling instructions, and the plurality of scheduling instructions are received as an instruction set in a form of joint encoding, correspondingly, the processor 810 obtains the location identifier includes: decodes a jointly encoded instruction set, and obtains each of the plurality of scheduling instructions carrying a location identifier, and obtains a location identifier corresponding to each of the plurality of scheduling instructions.

In a further embodiment, before determining the transmission subframe, the processor 810 receives the scheduling location identification rule issued by the base station through a target signaling channel, the target signaling channel being a Radio Resource Control (RRC) channel, a media access control MAC control element (CE) channel or a physical layer channel.

Specifically, the specific implementation method of the processor 810 for above instructions may refer to the description of related steps in the corresponding embodiment of FIG. 1 to FIG. 3, details not given here.

It should be noted that the various embodiments in the present specification are described in a progressive manner, and each embodiment focuses on differences from other embodiments, and the same similar parts between the various embodiments can referred to each other.

Finally, it should also be noted that in this context, relational terms such as first and second are used merely to distinguish one entity or operation from another entity or operation, it is not necessary to require or imply any such actual relationship or order between these entities or operations. Furthermore, the term "include" or any other variation thereof is intended to cover a non-exclusive include, thus, a process, method, article, or device that comprises a plurality of elements includes not only those elements but also other elements that are not explicitly listed, or elements that are inherent to such a process, method, article, or device. Without more restrictions, an element defined by the phrase "comprising one" does not exclude the presence of the same element in the process, method, item, or device that comprises the element.

The above describes a data method, terminal and transmission system provided by the present disclosure. The above description of the disclosed embodiments enables those skilled in the art to implement or use the present disclosure. Various modifications to these embodiments are obvious to those skilled in the art, and the general principles defined in the present disclosure may be implemented in other embodiments without departing from the spirit or scope of the disclosure. Therefore, the present disclosure is not to be limited to the embodiments shown above, but accord with the broadest scope consistent with the principles and novel features disclosed in the present disclosure.

We claim:

1. A data transmission method, executed by a terminal, comprising:
   receiving a scheduling instruction issued by a base station, the scheduling instruction carrying a location identifier, and the scheduling instruction being used for scheduling one or more transmission subframes;
   obtaining the location identifier, the location identifier being an orthogonal sequence that scrambles a scrambling result of the scheduling instruction through a cyclic redundancy check (CRC) scrambling;
   determining a transmission subframe according to the location identifier, a subframe where the scheduling instruction is located, and a scheduling location identification rule, the scheduling location identification rule comprising corresponding relationships between the location identifier, the subframe where the scheduling instruction is located, and the transmission subframe; and
   transmitting data through the transmission subframe.

2. The method of claim 1, wherein the location identifier is an information field located at a start location or an end location of the scheduling instruction, a length of the location identifier comprises at least one bit, and a length of the location identifier is fixed.

3. The method of claim 1, wherein, when there are a plurality of scheduling instructions, the plurality of scheduling instructions are received as an instruction set in a form of joint encoding;
   obtaining the location identifier comprises:
   decoding a jointly encoded instruction set, obtaining each of the plurality of scheduling instructions carrying a location identifier, and obtaining a location identifier corresponding to each of the plurality of scheduling instructions.

4. The method of claim 1, before determining the transmission subframe, further comprising:
   receiving the scheduling location identification rule issued by the base station through a target signaling channel; the target signaling channel being: a Radio Resource Control (RRC) channel, a media access control (MAC) control element (CE) channel or a physical layer channel.

5. A terminal, comprising:
   at least one processor; and
   a storage device storing a plurality of instructions, which when executed by the processor, causes the at least one processor to:
   receive a scheduling instruction issued by a base station, the scheduling instruction carrying a location identifier, and the scheduling instruction being used for scheduling one or more transmission subframes;
   obtain the location identifier, the location identifier being an orthogonal sequence that scrambles a scrambling result of the scheduling instruction through a cyclic redundancy check (CRC) scrambling;
   determine a transmission subframe according to the location identifier, a subframe where the scheduling instruction is located, and a scheduling location identification rule, the scheduling location identification rule comprising correspondence relations between the location identifier, the subframe where the scheduling instruction is located and the transmission subframe; and
   transmit data through the transmission subframe.

6. The terminal of claim 5, wherein the location identifier is an information field located at a start location or an end location of the scheduling instruction, a length of the location identifier comprises at least one bit, and a length of the location identifier is fixed.

7. The terminal of claim 5, where, when there are a plurality of scheduling instructions, the plurality of scheduling instructions are received as an instruction set in a form of joint encoding;
   wherein the at least one processor further: decodes a jointly encoded instruction set, obtains each of the plurality of scheduling instructions carrying a location identifier, and obtain a location identifier corresponding to each of the scheduling instructions.

8. The terminal of claim 5, wherein the at least one processor further:
   receives the scheduling location identification rule issued by the base station through a target signaling channel before determines the transmission subframe, the target signaling channel being a Radio Resource Control (RRC) channel, a media access control (MAC) control element (CE) channel or a physical layer channel.

9. A non-transitory storage medium having stored thereon instructions that, when executed by a processor of a terminal, causes the terminal to perform a data transmission method, the method comprising:
   receiving a scheduling instruction issued by a base station, the scheduling instruction carrying a location identifier, and the scheduling instruction being used for scheduling one or more transmission subframes;
   obtaining the location identifier, the location identifier being an orthogonal sequence that scrambles a scrambling result of the scheduling instruction through a cyclic redundancy check (CRC) scrambling;
   determining a transmission subframe according to the location identifier, a subframe where the scheduling instruction is located, and a scheduling location identification rule, the scheduling location identification rule comprising corresponding relationships between the location identifier, the subframe where the scheduling instruction is located, and the transmission subframe; and
   transmitting data through the transmission subframe.

10. The non-transitory storage medium of claim 9, wherein the location identifier is an information field located at a start location or an end location of the scheduling instruction, a length of the location identifier comprises at least one bit, and a length of the location identifier is fixed.

11. The non-transitory storage medium of claim 9, wherein, when there are a plurality of scheduling instructions, the plurality of scheduling instructions are received as an instruction set in a form of joint encoding;
   obtaining the location identifier comprises:
   decoding a jointly encoded instruction set, obtaining each of the plurality of scheduling instructions carrying a location identifier, and obtaining a location identifier corresponding to each of the plurality of scheduling instructions.

12. The non-transitory storage medium of claim 9, before determining the transmission subframe, further comprising:
   receiving the scheduling location identification rule issued by the base station through a target signaling channel; the target signaling channel being: a Radio Resource Control (RRC) channel, a media access control (MAC) control element (CE) channel or a physical layer channel.

* * * * *